US007909466B2

(12) United States Patent
Fukui et al.

(10) Patent No.: US 7,909,466 B2
(45) Date of Patent: Mar. 22, 2011

(54) PROJECT EQUIPPED WITH ULTRASONIC SPEAKER, AND METHOD FOR DISPLAYING SOUND REPRODUCTION RANGE IN PROJECTOR

(75) Inventors: Yoshiki Fukui, Suwa (JP); Akihito Uetake, Hachioji (JP)

(73) Assignee: Seiko Epson Corporation (JP)

( * ) Notice: Subject to any disclaimer, the term of this patent is extended or adjusted under 35 U.S.C. 154(b) by 810 days.

(21) Appl. No.: 10/589,685

(22) PCT Filed: Feb. 16, 2005

(86) PCT No.: PCT/JP2005/002826
§ 371 (c)(1), (2), (4) Date: Dec. 19, 2006

(87) PCT Pub. No.: WO2005/081575
PCT Pub. Date: Sep. 1, 2005

(65) Prior Publication Data

US 2008/0212033 A1 Sep. 4, 2008

(30) Foreign Application Priority Data

Feb. 19, 2004 (JP) ................................ 2004-043109

(51) Int. Cl.
*G03B 31/00* (2006.01)
*G03B 21/00* (2006.01)
*G01N 29/00* (2006.01)
*H04R 3/00* (2006.01)

(52) U.S. Cl. ........... 353/15; 353/121; 73/1.82; 73/1.46; 381/116

(58) Field of Classification Search .................... 353/15, 353/18, 121, 122; 73/1.82, 1.46, 649; 381/116
See application file for complete search history.

(56) References Cited

U.S. PATENT DOCUMENTS 1,942,748 A * 1/1934 De Ybarrondo ................. 352/6
4,577,188 A 3/1986 Inami et al.
5,995,706 A 11/1999 Iijima et al.
6,643,377 B1 * 11/2003 Takahashi et al. ............ 381/306
6,798,889 B1 9/2004 Dicker et al.
6,807,281 B1 10/2004 Sasaki et al.
2006/0033882 A1 * 2/2006 Matsuzawa et al. ............ 353/15

FOREIGN PATENT DOCUMENTS

EP 0 536 959 A2 4/1993
JP 58-119293 A 7/1983
JP 02-250600 10/1990
JP 05-101608 A 4/1993
JP 10-262967 A 10/1998

(Continued)

OTHER PUBLICATIONS

Translation of JP 11-095324 A. Sep. 4, 1999.*

(Continued)

*Primary Examiner* — Georgia Y Epps
*Assistant Examiner* — Magda Cruz
(74) *Attorney, Agent, or Firm* — Harness, Dickey & Pierce, P.L.C.

(57) ABSTRACT

A projector includes an ultrasonic speaker, a visual information generation unit that generates visual information relating to a sound reproduction range of the ultrasonic speaker, and an image projection unit that displays the visual information generated by the visual information generation unit on a screen.

7 Claims, 6 Drawing Sheets

FOREIGN PATENT DOCUMENTS

| | | | | |
|---|---|---|---|---|
| JP | 11-27774 | A | | 1/1999 |
| JP | 11-095324 | | | 4/1999 |
| JP | 11-98592 | A | | 4/1999 |
| JP | 11095324 | A | * | 4/1999 |
| JP | 11-262084 | | | 9/1999 |
| JP | 2000-023281 | | | 1/2000 |
| JP | 2000-83291 | A | | 3/2000 |
| JP | 2000-184310 | | | 6/2000 |
| JP | 2005-121961 | | | 5/2005 |
| WO | WO 00/18182 | | | 3/2000 |

OTHER PUBLICATIONS

International Search Report and Written Opinion of the International Searching Authority (in English) dated May 23, 2005; ISA/JP.

* cited by examiner

PROJECT EQUIPPED WITH ULTRASONIC SPEAKER, AND METHOD FOR DISPLAYING SOUND REPRODUCTION RANGE IN PROJECTOR

TECHNICAL FIELD

The present invention relates to a projector equipped with an ultrasonic speaker and a method for displaying the sound reproduction range in such a projector, and more particularly, to a projector equipped with an ultrasonic speaker and a method for displaying the sound reproduction range in such a projector that allows setting of the sound reproduction range to be carried out easily and suitably and is able to improve convenience by eliminating the bother associated with setting up the projector.

BACKGROUND ART

Ultrasonic speakers that utilize the non-linearity of a medium (air) with respect to ultrasonic waves are known in the prior art which are able to reproduce signals of the audible frequency band that have much sharper directivity as compared with ordinary speakers.

The constitution of ultrasonic speakers is such that the carrier signal in an ultrasonic frequency band is modulated by a signal from a signal source of the audible frequency band, the resulting signal is converted into sound waves of a finite amplitude level from an ultrasonic transducer after being amplified with a power amplifier and so forth, and the sound waves are radiated through a medium (air) to reproduce a signal sound in an audible frequency range due to the nonlinear effects of the medium (air). In this case, the reproduction range of the reproduced signal in the audible frequency range is a beam-shaped range in the direction of the axis of radiation from the ultrasonic transducer (refer to, for example, Japanese Unexamined Patent Application, First Publication No. S58-119293).

However, since the sound reproduction range cannot be seen, in order to set the reproduction range as intended, it is necessary to carry out the bothersome task of confirming the setting while alternately moving the location where the sound is likely to be reproduced and the location where the speaker is placed.

In addition, as a related example of the prior art, an invention is disclosed in which an audible sound demodulation range resulting from parametric relay effects is indicated with an illumination device when ultrasonic waves that have been modulated with an audible audio signal are radiated. This invention indicates the reproduction range (audible sound demodulation range) of an ultrasonic speaker with an illumination device (spotlight) to indicate it visually. However, in this invention, since the reproduction range during installation of the ultrasonic speaker is imparted as fixed information, and there is no concept of accommodating the installation conditions or controlling the reproduction range, it does not allow volume and other information required at the time of installation to be visually confirmed (refer to, for example, Japanese Unexamined Patent Application, First Publication No. H11-27774).

DISCLOSURE OF THE INVENTION

In order to solve the aforementioned problems, an object of the present invention is to provide a projector equipped with an ultrasonic speaker and a method for displaying the sound reproduction range in the projector that are capable of improving convenience by eliminating the bother associated with setting up the projector by displaying a visual guide when setting the sound reproduction range by using a projection function of a device (such as a projector) in which an ultrasonic speaker is installed in the form of a directional sound.

The present invention provides a projector including: an ultrasonic speaker; a visual information generation unit that generates visual information relating to a sound reproduction range of the ultrasonic speaker; and an image projection unit that displays the visual information generated by the visual information generation unit on a screen.

As a result of employing this constitution, visual information relating to the sound reproduction range is generated and visually displayed in the form of a guide information on a screen by using the image projection function of the projector. As a result, a user is able to easily and suitably set the reproduction range of the ultrasonic speaker of the projector while viewing images indicating the sound reproduction range, reproduction volume and direction in which sound is reflected from the screen and so forth displayed on the screen. Consequently, the problems of the prior art such as the difficulty in determining the sound reproduction range and the bother associated with setting up the projector are eliminated, thereby making it possible to improve convenience when setting up the projector.

In addition, in the projector of the present invention, the visual information relating to the sound reproduction range and displayed on the screen may preferably include at least one of sound reproduction range information, reproduction volume information, and direction information of sound reflected from the screen.

As a result of employing this constitution, a user is able to easily and suitably set the reproduction range of the ultrasonic speaker of the projector while viewing images indicating the sound reproduction range, reproduction volume and direction of sound reflected from the screen displayed on the screen. Consequently, the problems of the prior art such as the difficulty in determining the sound reproduction range and the bother associated with setting up the projector are eliminated, thereby making it possible to improve convenience when setting up the projector.

In addition, in the projector of the present invention, the ultrasonic speaker may include: a carrier wave oscillation source that generates a carrier wave signal in an ultrasonic frequency band; an audible frequency oscillation source that generates a signal in an audible frequency band; a modulation section that generates a modulated signal by modulating the carrier wave signal generated from the carrier wave oscillation source using the signal in the audible frequency band from the audible frequency oscillation source; a power amplifier that amplifies the modulated signal; an ultrasonic transducer that converts the modulated signal amplified by the power amplifier into sound waves of a finite amplitude level and radiates the sound waves through a medium; a reproduction range setting section that sets a sound reproduction range, volume, and other predetermined settings of the ultrasonic transducer and stores the setting information; and a reproduction range control processing section that adjusts the signal of the audible frequency band generated with the carrier wave oscillation source based on the settings of the reproduction range setting section. The projector may further include: a distance measuring section that measures the distance between the screen and the projector; a visual information generation section that generates the visual information relating to the sound reproduction range based on the setting information set by the reproduction range setting section and on information of the distance between the screen and the projector measured by the distance measuring section; and an image projection section that projects visual information generated by the visual information generation section.

As a result of employing this constitution, a signal of the ultrasonic frequency range generated by the carrier wave oscillation source is modulated with an audible frequency signal from the audible frequency oscillation source in the modulation section, this modulated signal is amplified with the power amplifier, the modulated signal amplified by the power amplifier is converted into sound waves at a finite amplitude level by the ultrasonic transducer, and those sound waves are then radiated through a medium (air). In this case, setting of the range over which sound is reproduced, that information as well as volume and other information are retained by the reproduction range setting section. The generated frequency range of the carrier wave oscillation source is adjusted based on the settings of the reproduction range setting section. In addition, visual information relating to the sound reproduction range is generated by the visual information generation section based on the settings of the reproduction range setting section and information on the distance between the screen and projector measured by the distance measuring section, and projected onto the screen by the image projection section.

As a result, a user is able to easily and suitably set the reproduction range of the ultrasonic speaker of the projector while viewing images indicating the sound reproduction range, reproduction volume and direction in which sound is reflected from the screen and so forth displayed on the screen. Consequently, the problems of the prior art such as the difficulty in determining the sound reproduction range and the bother associated with setting up the projector are eliminated, thereby making it possible to improve convenience when setting up the projector.

In addition, the projector the present invention may include: a plurality of ultrasonic speakers; and a unit that generates visual information relating to a sound reproduction range of each ultrasonic speaker and displays the visual information on the screen.

As a result of employing this constitution, images indicating the sound reproduction range, reproduction volume and direction in which sound is reflected from the screen are displayed on the screen for each ultrasonic speaker in a projector having a stereo reproduction function equipped with a plurality of ultrasonic speakers.

As a result, a user is able to easily and suitably set stereo reproduction effects (including image orientation) while viewing images indicating the sound reproduction range, reproduction volume and direction in which sound is reflected from the screen for each ultrasonic speaker displayed on the screen.

In addition, the present invention provides a method for displaying sound reproduction range in a projector equipped with an ultrasonic speaker. The method includes the steps of: generating visual information relating to a sound reproduction range of the ultrasonic speaker; and displaying the visual information generated in the step of generating visual information on a screen.

As a result of employing this method, visual information relating to the sound reproduction range is generated and visually displayed in the form of a guide information on a screen by using the image projection function of the projector. As a result, a user is able to easily and suitably set the reproduction range of the ultrasonic speaker of the projector while viewing images indicating the sound reproduction range, reproduction volume and direction in which sound is reflected from the screen and so forth displayed on the screen. Consequently, the problems of the prior art such as the difficulty in determining the sound reproduction range and the bother associated with setting up the projector are eliminated, thereby making it possible to improve convenience when setting up the projector.

In addition, in the above method, the visual information relating to the sound reproduction range and displayed on the screen may preferably include at least one of sound reproduction range information, reproduction volume information, and direction information of sound reflected from the screen.

As a result of employing this method, a user is able to easily and suitably set the reproduction range of the ultrasonic speaker of the projector while viewing images indicating the sound reproduction range, reproduction volume and direction of sound reflected from the screen displayed on the screen. Consequently, the problems of the prior art such as the difficulty in determining the sound reproduction range and the bother associated with setting up the projector are eliminated, thereby making it possible to improve convenience when setting up the projector.

In addition, in the above method, the projector may include a plurality of ultrasonic speakers, and the method may include the steps of: generating visual information relating to a sound reproduction range of each ultrasonic speaker; and displaying the visual information on the screen.

As a result of employing this method, images indicating the sound reproduction range, reproduction volume and direction in which sound is reflected from the screen are displayed on the screen for each ultrasonic speaker in a projector having a stereo reproduction function equipped with a plurality of ultrasonic speakers.

As a result, a user is able to easily and suitably set stereo reproduction effects (including image orientation) while viewing images indicating the sound reproduction range, reproduction volume and direction in which sound is reflected from the screen for each ultrasonic speaker displayed on the screen.

BRIEF DESCRIPTION OF THE DRAWINGS

FIG. 2A is a schematic perspective view, and FIG. 2B is a schematic side view.

FIG. 3A shows the case in which an angle of directivity θ is 20°, and FIG. 3B shows the case in which an angle of directivity θ is 30°.

BEST MODE FOR CARRYING OUT THE INVENTION

The following provides an explanation of the best mode for carrying out the present invention with reference to the drawings.

First Embodiment

Figure 1:
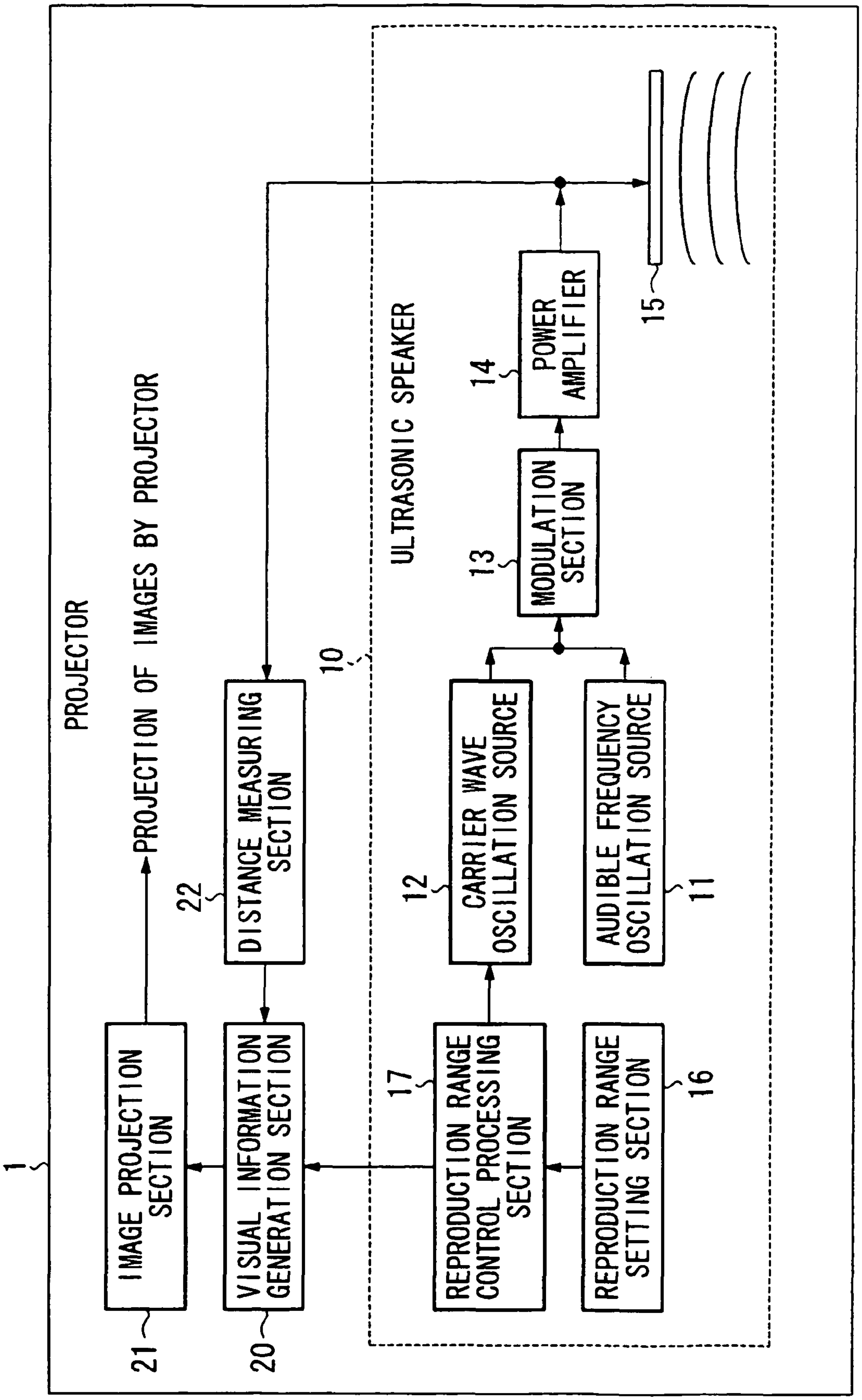
FIG. 1 is a drawing showing an example of the constitution of a projector equipped with an ultrasonic speaker according to the present invention.

FIG. 1 is a block diagram showing an example of the constitution of a projector 1 equipped with an ultrasonic speaker according to the present invention. In the projector 1 equipped with an ultrasonic speaker, information is displayed on a screen using images projected by the projector 1 in order to visually display the sound reproduction range of the projector equipped with an ultrasonic speaker 10.

In FIG. 1, an audible frequency oscillation source 11 has a function that generates a signal wave of the audible frequency band. In addition, a carrier wave oscillation source 12 has a function that generates a carrier wave of a frequency of the ultrasonic frequency band. A reproduction range setting section 16 has operating keys, knobs and other operating units to enable a user to input data for specifying the sound reproduction range, and when the data is input, has a function that sets and stores the data.

Figure 6:
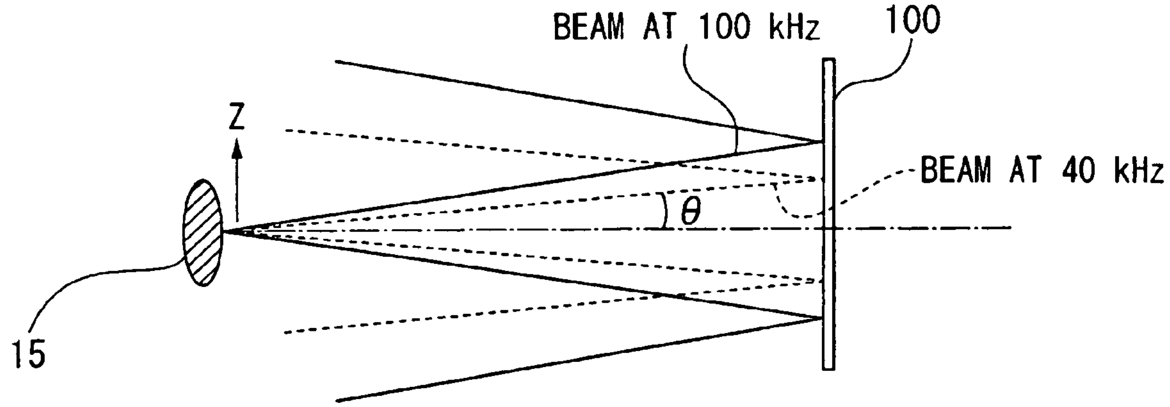
FIG. 6 is a drawing showing the state of a beam radiated from an ultrasonic speaker.

A reproduction range control processing section 17 has a function that controls the carrier wave frequency by changing the frequency of the carrier wave generated by the carrier wave oscillation source 12 so as to be within the set reproduction range by referring to the settings of the reproduction range setting section 16. As shown in the drawing of FIG. 6 showing the shape of a beam radiated from the ultrasonic speaker, the beam width (angle of directivity θ) of the ultrasonic waves radiated from an ultrasonic transducer 15 changes according to the magnitude of the frequency of the carrier wave. For example, the spread in the direction of the Z-axis differs between a 100 kHz beam and a 40 kHz beam, and the sound reproduction range can be adjusted by controlling the carrier frequency.

The carrier wave oscillation source 12 generates a carrier wave of a frequency specified by the reproduction range control processing section 17 and supplies it to a modulation section 13. The modulation section 13 has a function that performs amplitude modulation for the carrier wave supplied from the carrier wave oscillation source 12 with a signal wave output by the audible frequency oscillation source 11, and outputs the modulated signal to a power amplifier 14.

The ultrasonic transducer 15 is driven by the modulated signal output from the modulation section 13 through the power amplifier 14, and has a function that reproduces a signal sound of the audible frequency band (reproduced signal) by converting the modulated signal into sound waves having a finite amplitude level and radiating those sound waves through a medium.

A visual information generation section (visual information generation unit) 20 has a function that generates visual information (guide information) relating to sound reproduction range based on information set by the reproduction range setting section 16 and information on the distance between projector 1 and the screen. An image projection section (image projection unit) 21 has a function that projects visual information (guide information) generated by the visual information generation section 20 onto the screen.

A distance measuring section 22 has a function that measures the distance between the screen and the projector. A distance sensor that uses an optical our acoustic technique such as an ultrasonic distance sensor or optical distance sensor can be used for measuring this distance. Furthermore, general reference information according to distance can also be displayed in the form of guide information instead of measuring distance using the distance measuring section 22.

Next, an explanation is provided of a specific example of a method for displaying sound reproduction range by a projector equipped with an ultrasonic speaker of the present invention.

Figure 2A:
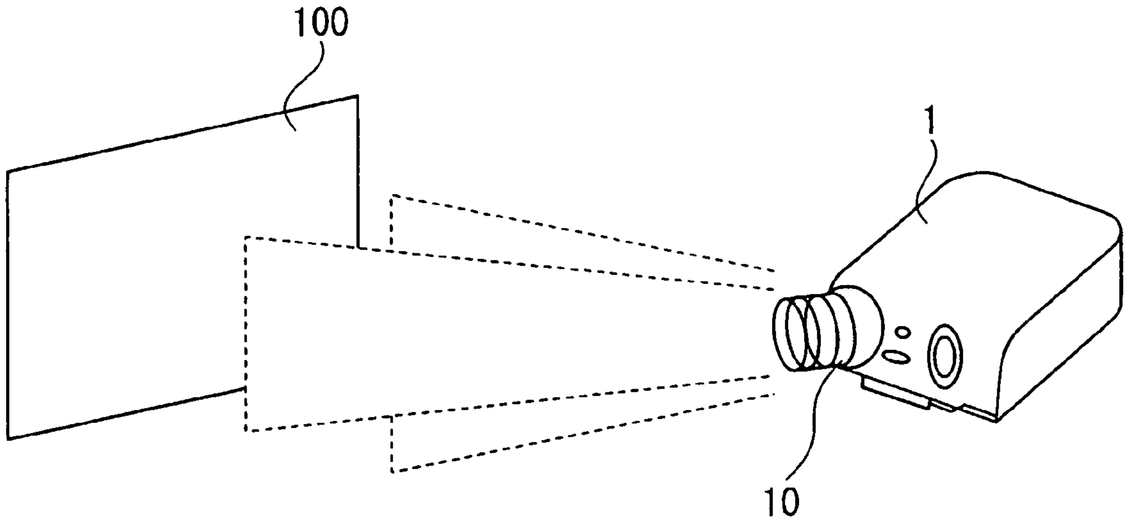
FIGS. 2A and 2B are drawings showing an example of using a device according to the present invention, in particular.
Figure 2B:
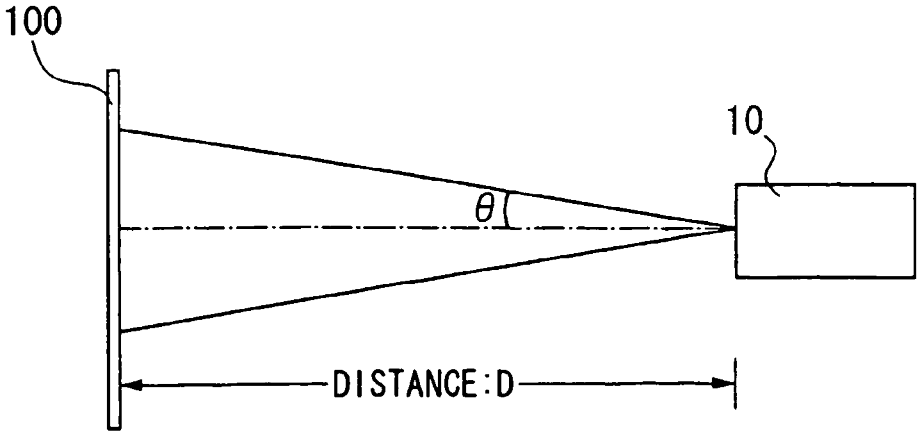

FIGS. 2A and 2B are drawings showing an example of using a device according to the present invention, in particular, FIG. 2A is a schematic perspective view, and FIG. 2B is a schematic side view. The projector 1 is installed directly in front of a screen 100, sound waves from the ultrasonic speaker 10 equipped therein are radiated towards the screen 100 at a specified angle of directivity θ, and sound waves reflected from the screen 100 at the same angle of directivity θ reach a listener.

In this case, distance D between the projector 1 and the screen 100 is first acquired (by using a pulse echo method and so forth) by the distance measuring section 22 using an ultrasonic distance sensor. In addition, the current angle of directivity θ and reproduced volume information are simultaneously acquired from the reproduction range setting section 16, and guide information is then generated using the visual information generation section 20 according to this information.

Figure 3A:
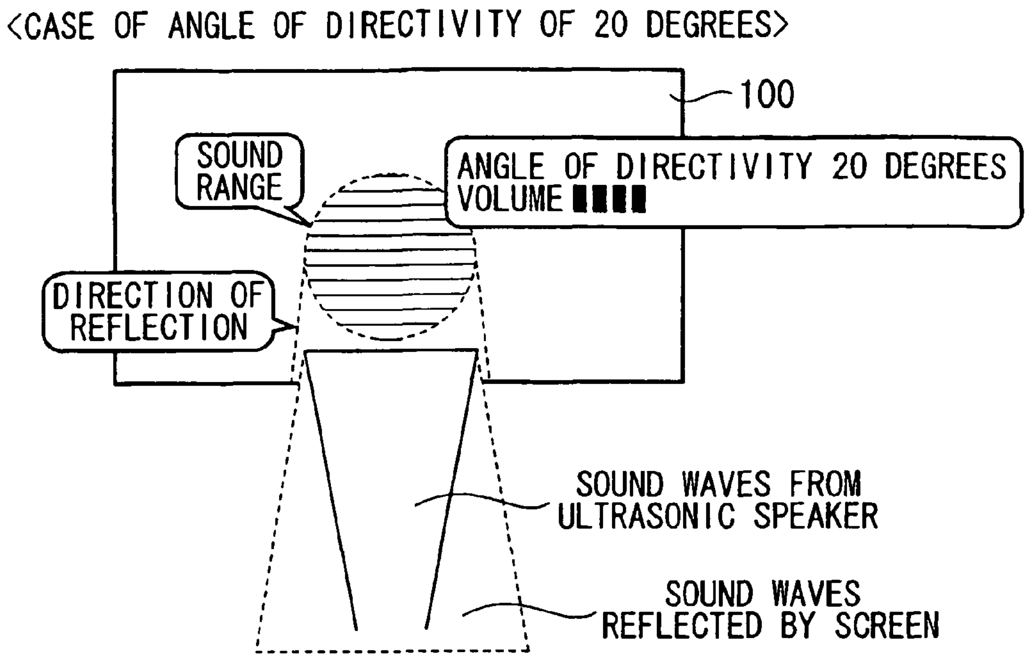
FIGS. 3A and 3B are drawings showing examples of the display of guide information, in particular.
Figure 3B:
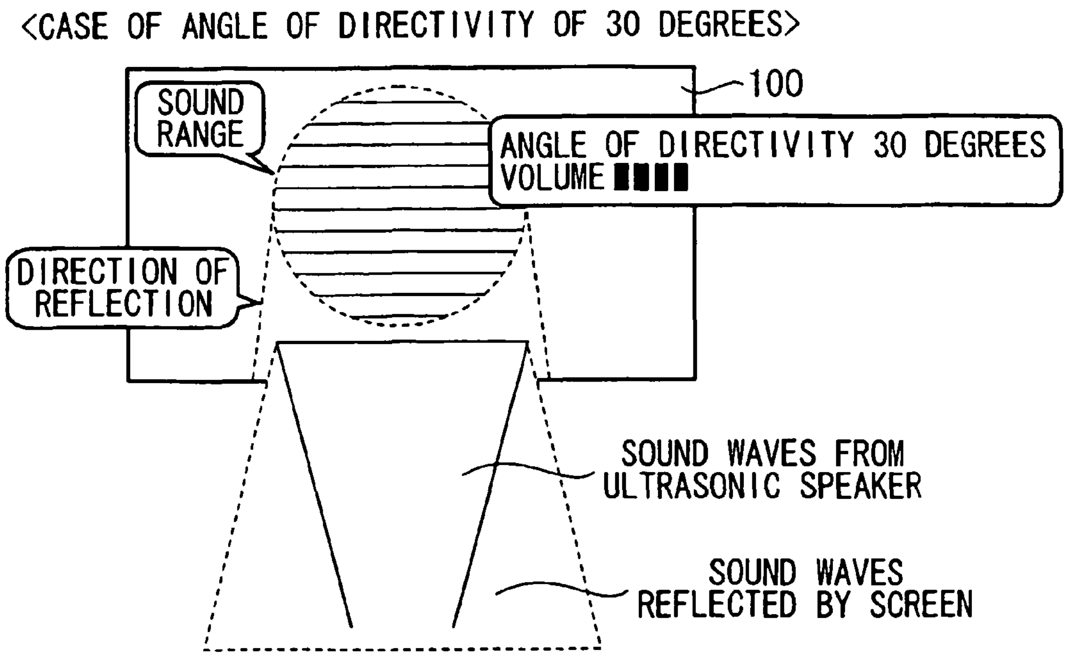

FIGS. 3A and 3B are drawings showing examples of the display of guide information. As shown in FIGS. 3A and 3B, examples of guide information displayed on the screen include the sound range, reproduction volume and direction of reflection. FIG. 3A shows the case of an angle of directivity of $\theta=20°$, while FIG. 3B shows the case of an angle of directivity of $\theta=30°$.

Furthermore, the sound range displayed on the screen 100 is a circular image, and its radius is calculated from the distance to the screen and the angle of directivity. (Radius of projected circle=(distance D to screen×tan θ (angle of directivity)).

In this manner, guide information enables a user to visually confirm settings information as a result of being projected onto the screen 100 by the image projection section 21. In the case a user desires to change the reproduction range based on the guide information, by changing the settings information in accordance with the setting method provided by the reproduction range setting section 16 (composed so as to allow adjustments to be made with knobs or other type of interface according to the form of use), guide information based on the new settings information is displayed by repeating the aforementioned procedure.

As has been explained above, in a projector equipped with an ultrasonic speaker of the present invention, a user is able to easily and suitably set the reproduction range of the ultrasonic speaker of the projector while viewing images displayed on the screen that indicate the sound reproduction range, reproduction volume, and direction in which sound is reflected from the screen, thereby improving convenience by eliminating the bother associated with setting up the projector.

Second Embodiment

In addition, the present invention can also be applied to a projector equipped with a plurality of ultrasonic speakers. For example, guide information can also be effectively displayed in the case of stereo reproduction using a plurality of ultrasonic speakers accompanied by moving sections.

Figure 4:
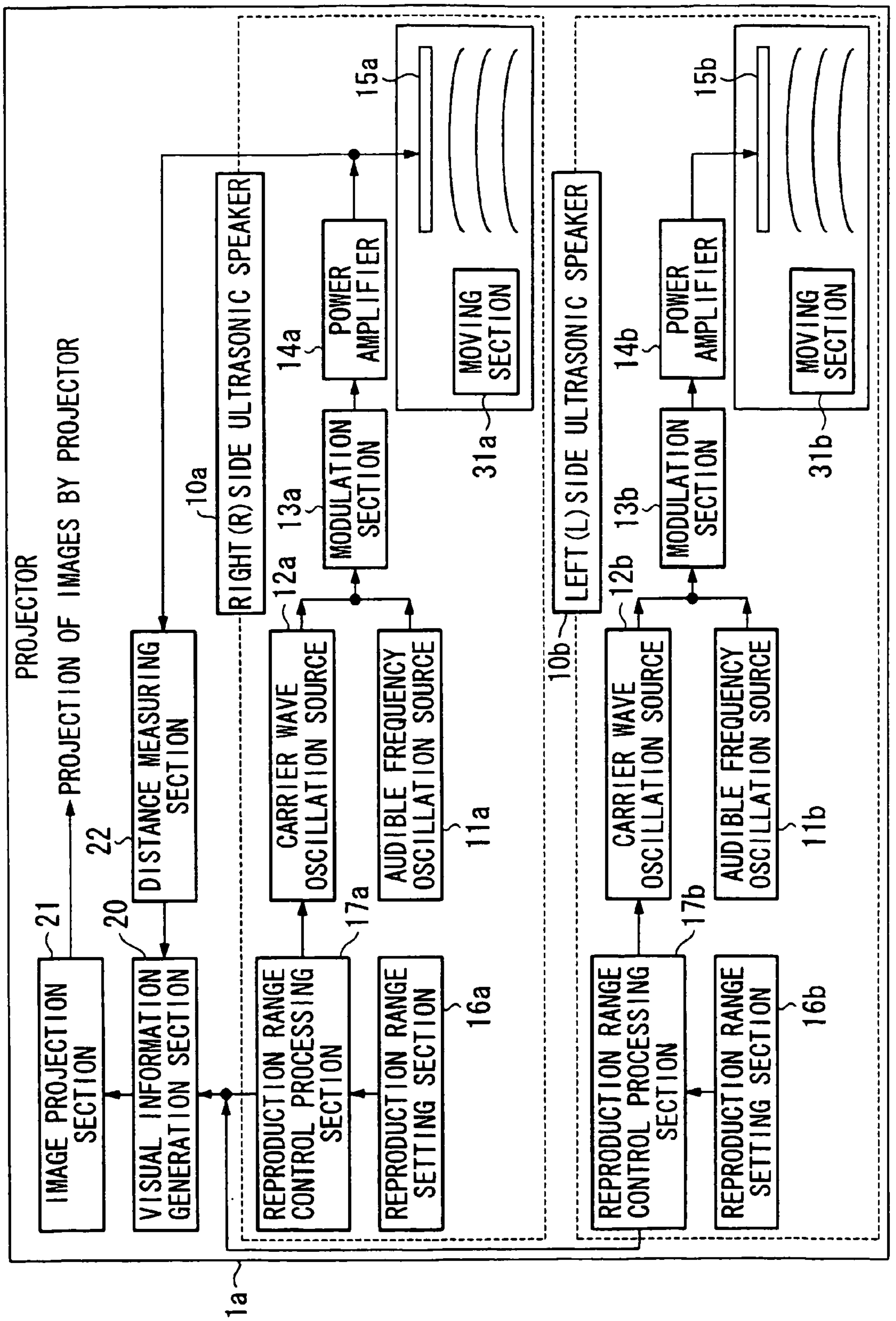
FIG. 4 is a drawing showing an example of a projector having a stereo configuration.

FIG. 4 is a drawing showing an example of a projector equipped with two ultrasonic speakers, and shows an example in which a projector 1*a* is equipped with a right (R) side ultrasonic speaker 10*a* and a left (L) side ultrasonic speaker 10*b* of the same constitution.

Although an audible frequency oscillation source 11*a*, a carrier wave oscillation source 12*a*, a modulation section 13*a*, a power amplifier 14*a*, an ultrasonic transducer 15*a*, a reproduction range setting section 16*a*, a reproduction range control processing section 17*a*, the visual information generation section 20, the image projection section 21, and the distance measuring section 22 that compose the right (R) side ultrasonic speaker 10*a* are basically the same as those shown in FIG. 1, they differ in that the ultrasonic speaker 15*a* is composed to allow the axis of radiation to be moved by a moving section 31*a*, and in that the right (R) side sound source is reproduced during stereo reproduction. The moving section 31*a* imparts the optimum stereo reproduction effects (such as image orientation) to a listener by regulating the direction in which sound is radiated from the ultrasonic transducer 15*a*.

In addition, an audible frequency oscillation source 11*b*, a carrier wave oscillation source 12*b*, a modulation section 13*b*, a power amplifier 14*b*, an ultrasonic transducer 15*b*, a reproduction range setting section 16*b*, a reproduction range control processing section 17*b*, and a moving section 31*b* that compose the left (L) side ultrasonic speaker 10*b* are basically the same as those of the right (R) side ultrasonic speaker 10*a*, and differs in that the left (L) side sound source is reproduced during stereo reproduction.

Figure 5:
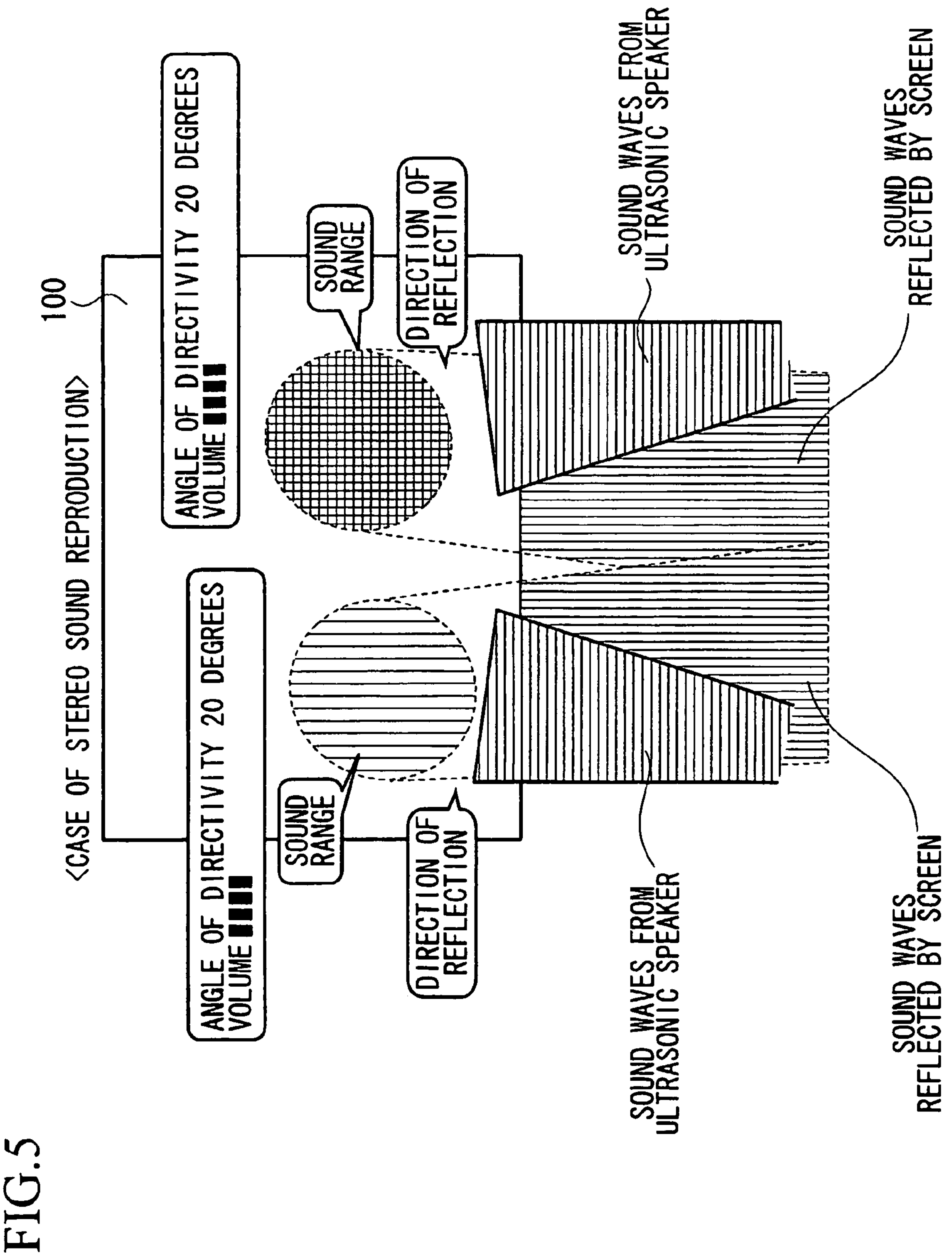
FIG. 5 is a drawing showing an example of the display of guide information in a projector having a stereo configuration.

FIG. 5 is a drawing showing an example of the display of guide information in a projector employing a stereo configuration as shown in FIG. 4. Basically, the guide information displayed in the case of the projector being composed of a single ultrasonic speaker as shown in FIGS. 3A and 3B is simply displayed twice, and it is only required that the information corresponding to each speaker be able to be distinguished. In the example shown in FIG. 5, although the reproduction range according to each ultrasonic speaker can be differentiated according to its pattern, they may also be differentiated by other methods such as using different colors or displaying character information that clearly indicates each speaker.

In addition, since information of the moving sections (such as angle of rotation and so forth) is set with the reproduction range setting sections 16*a* and 16*b* and is used in the reproduction range control processing sections 17*a* and 17*b*, guide information corresponding to the angles of rotation of the moving sections can be generated using the visual information generation section 20.

Furthermore, although the example of the projector being equipped with two ultrasonic speakers is shown in FIG. 4 as an example of a constitution of a projector having a plurality of ultrasonic speakers, the number of ultrasonic speakers equipped in the projector may be an arbitrary number "n".

While preferred embodiments of the invention have been described and illustrated above, it should be understood that these are exemplary of a projector equipped with an ultrasonic speaker of the present invention and are not to be considered as limiting, and various modifications can be made without departing form the spirit or scope of the present invention.

INDUSTRIAL APPLICABILITY

In the present invention, since visual guide information is displayed when setting a sound reproduction range due to a projection function of a device (e.g., projector) equipped with an ultrasonic speaker, the effect is demonstrated that improves convenience by eliminating the bother associated with setting up the projector, thereby enabling the present invention to be applied as a projector equipped with an ultrasonic speaker and a method for displaying the sound reproduction range in the projector.

The invention claimed is:

1. A projector comprising:

an ultrasonic speaker;

a visual information generation unit that generates visual information relating to a sound reproduction range of the ultrasonic speaker; and an image projection unit that displays the visual information generated by the visual information generation unit on a screen, wherein the sound reproduction range is a beam-shaped range in a direction of an axis of radiation from the ultrasonic speaker, in which a sound is likely to be reproduced from the ultrasonic speaker.

2. A projector according to claim 1, wherein the visual information relating to the sound reproduction range the and displayed on the screen includes at least one of sound reproduction range information, reproduction volume information, and direction information of sound reflected from the screen.

3. A projector according to claim 1 wherein the ultrasonic speaker comprises: a carrier wave oscillation source that generates a carrier wave signal in an ultrasonic frequency band; an audible frequency oscillation source that generates a signal in an audible frequency band; a modulation section that generates a modulated signal by modulating the carrier wave signal generated from the carrier wave oscillation source using the signal in the audible frequency band from the audible frequency oscillation source; a power amplifier that amplifies the modulated signal; an ultrasonic transducer that converts the modulated signal amplified by the power amplifier into sound waves of a finite amplitude level and radiates the sound waves through a medium; a reproduction range setting section that sets the sound reproduction range, volume, and other predetermined settings of the ultrasonic transducer and stores the setting information; and a reproduction range control processing section that adjusts the signal of the audible frequency band generated using the carrier wave oscillation source based on the settings of the reproduction range setting section, the projector further comprising:

a distance measuring section that measures the distance between the screen and the projector;

a visual information generation section that generates the visual information relating to the sound reproduction range, based on the setting information set by the reproduction range setting section and on information of the distance between the screen and the projector measured by the distance measuring section; and an image projection section that projects visual information generated by the visual information generation section.

4. A projector according to claim 1, comprising:

a plurality of ultrasonic speakers; and a unit that generates visual information relating to the sound reproduction range of each ultrasonic speaker and displays the visual information on the screen.

5. A method for displaying a sound reproduction range in a projector equipped with the ultrasonic speaker, the method comprising the steps of:

generating visual information relating to the sound reproduction range of the ultrasonic speaker; and displaying the visual information generated in the step of generating visual information on a screen, wherein the sound reproduction range is a beam-shaped ranged in a direction of an axis of radiation from the ultrasonic speaker, in which a sound is likely to be reproduced from the ultrasonic speaker.

6. A method for displaying the sound reproduction range in a projector, according to claim 5, wherein the visual information relating to the sound reproduction range and displayed on the screen includes at least one of sound reproduction range information, reproduction volume information, and direction information of sound reflected from the screen.

7. A method for displaying the sound reproduction range in a projector, according to claim 5, wherein the projector comprises a plurality of ultrasonic speakers, the method comprising the steps of:

generating visual information relating to the sound reproduction range of each ultrasonic speaker; and displaying the visual information on the screen.

* * * * *

UNITED STATES PATENT AND TRADEMARK OFFICE

CERTIFICATE OF CORRECTION

PATENT NO. : 7,909,466 B2
APPLICATION NO. : 10/589685
DATED : March 22, 2011
INVENTOR(S) : Yoshiki Fukui et al.

It is certified that error appears in the above-identified patent and that said Letters Patent is hereby corrected as shown below:

Title Page and Col. 1 lines 1-4

Item (54), Title should be: "Projector Equipped with Ultrasonic Speaker, and Method for Displaying Sound Reproduction Range in Projector"

Signed and Sealed this
Fifth Day of July, 2011

David J. Kappos
*Director of the United States Patent and Trademark Office*